US006793772B2

(12) United States Patent
Berbner et al.

(10) Patent No.: US 6,793,772 B2
(45) Date of Patent: Sep. 21, 2004

(54) USE OF MELAMINE RESIN FIBERS AND INSULATING MATERIALS BASED ON MELAMINE RESIN FIBERS AND POLYALKYLENE TEREPHTHALATE FIBERS

(75) Inventors: Heinz Berbner, Mörlenbach (DE); Karl Ott, Plankstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/000,330

(22) Filed: Dec. 4, 2001

(65) Prior Publication Data

US 2002/0060012 A1 May 23, 2002

Related U.S. Application Data

(62) Division of application No. 09/555,598, filed as application No. PCT/EP98/07784 on Dec. 1, 1998, now abandoned.

(30) Foreign Application Priority Data

Dec. 4, 1997 (DE) .......................................... 197 53 834

(51) Int. Cl.⁷ .............................................. D21H 13/12
(52) U.S. Cl. ................. 162/146; 162/157.2; 162/157.3; 428/221; 428/332; 428/337; 428/340
(58) Field of Search ............................... 162/146, 157.2, 162/157.3; 428/221, 340, 332, 337; 52/747.1, 506.01, 309.1, 309.13, 408; 442/333

(56) References Cited

U.S. PATENT DOCUMENTS 5,387,382 A    2/1995   Fottinger et al. ............ 264/113
5,677,027 A   10/1997   Masuda et al. ................ 428/96

FOREIGN PATENT DOCUMENTS

| CA | 2222206    | 1/1997  |
| DE | 23 64 091  | 7/1974  |
| DE | 31 47 308  | 6/1983  |
| EP | 080 655    | 2/1986  |
| EP | 523 485    | 12/1995 |
| GB | 1 452 629  | 10/1976 |
| RO | 112038     | 4/1997  |

*Primary Examiner*—Peter Chin
(74) *Attorney, Agent, or Firm*—Keil & Weinkauf

(57) ABSTRACT

The disclosure is directed to a method of using melamine resin fibers, to an insulating material comprising
  a) from 5 to 95% by weight of melamine resin, and
  b) from 5 to 95% by weight of polyalkylene terephthalate fibers, and
to processes for producing it.

13 Claims, No Drawings

USE OF MELAMINE RESIN FIBERS AND INSULATING MATERIALS BASED ON MELAMINE RESIN FIBERS AND POLYALKYLENE TEREPHTHALATE FIBERS

This is a divisional of application Ser. No. 09/555,598, which is the National Stage of international application PCT/EP98/07784 filed Dec. 1, 1998, now abandoned.

The present invention relates to the use of melamine resin fibers and insulating materials based on melamine resin fibers and polyalkylene terephthalate fibers and processes for their production.

Insulating materials in the building construction sector, for example for the thermal and acoustic insulation of buildings and parts of buildings, are frequently produced using insulating mats based on glass or mineral fibers. It is true that these materials generally have good insulating properties, but they also have the disadvantage that they are brittle and very fragile, releasing very short fibrous fragments in certain circumstances. Consequently, they are not always easy to process into fiber mats; secondly, respirable microfibers are considered a health hazard. Furthermore, inorganic materials generally have a higher density than organic materials, which leads to heavier products and thus to higher transportation costs.

There is consequently a need for an insulating material which is based on organic fibers, which substantially equals the insulating properties of inorganic materials, which is simple to produce and which is easy to process.

DE-A 31 47 308 and EP-A 80 655 describe insulating materials composed of melamine resin fiber mats having the following properties:
a) the thickness is between 20 and 200 mm,
b) the density is between 10 and 150 g $l^{-1}$,
c) the DIN 52 612 thermal conductivity is less than 0.05 W $m^{-1}$ $K^{-1}$,
d) the DIN 52 215-63 sound absorption at 2500 Hz, converted from perpendicular to stationary sound incidence, is greater than 90%,
e) the recovery capacity, measured on a 100 mm thick mat compressed to 30 mm within 2 min and held at that thickness for 24 hours, is so high that the mat, on the pressure being removed, spontaneously rebounds to a thickness of more than 80 mm and, after 6 hours, has come back to a thickness of more than 98 mm,
f) the fire behavior is so favorable that building material class B1 (low-flammable) is achieved in the DIN 4102 Part I fire test.

The melamine resins used can be melamine/formaldehyde condensation products which, as well as melamine, can contain up to 50% by weight of other thermoset-formers and, as well as formaldehyde, up to 50% by weight of other aldehydes in cocondensed form. The thermoset-formers used can be alkyl-substituted melamine, urea, urethanes, carboxamides, dicyandiamides, guanidine, sulfurylamide, sulfonamide, aliphatic amines and also phenols and its derivatives. Examples of usable aldehydes are acetaldehyde, trimethylolacetaldehyde, acrolein, benzaldehyde, furfural, glyoxal, phthalaldehyde and terephthalaldehyde. However, preference is given to unmodified melamine/formaldehyde condensation products. The insulating materials based on these melamine resin fiber mats can be used for thermal and acoustic protection of buildings and parts of buildings.

EP-A 523 485 describes condensation products obtainable by condensational mixture of a) melamine, b) substituted melamines and unsubstituted and/or substituted phenols with formaldehyde or formaldehyde-supplying compounds, a process for their production and their use for producing fibers. These condensation products are notable for improved hydrolysis stability and reduced formaldehyde emissions.

It is an object of the present invention to find novel advantageous uses for melamine resin fibers obtainable as described in EP-A-523 485, for example.

We have found that this object is achieved by a method of using modified melamine resin fibers obtainable by condensational mixture comprising
(A) from 90 to 99.9 mol % of a mixture comprising
(a) from 30 to 99.9 mol % of melamine and
(b) from 1.0 to 70 mol % of a substituted melamine of the general formula I

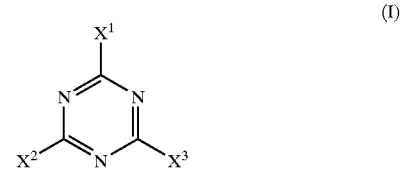

where $X^1$, $X^2$ and $X^3$ are each selected from $-NH_2$, $-NHR^1$ and $-NR^1R^2$, subject to the proviso that $X^1$, $X^2$ and $X^3$ are not all $-NH_2$, and $R^1$ and $R^2$ are independently selected from hydroxy-$C_2$–$C_{20}$-alkyl, hydroxy-$C_2$–$C_4$-alkyl-(oxa-$C_2$–$C_4$-alkyl)$_n$, where n is from 1 to 5, and amino-$C_2$–$C_{12}$-alkyl, or mixtures of melamines of formula I, and
(B) from 0.1 to 10 mol %, based on (A) and (B), of a compound selected from phenols which are unsubstituted or substituted by radicals selected from $C_1$–$C_9$-alkyl and hydroxyl, $C_1$–$C_4$-alkanes substituted by two or three phenol groups, di(hydroxyphenyl) sulfones and mixtures thereof,
with formaldehyde or formaldehyde-supplying compounds in a molar ratio of melamines to formaldehyde within the range from 1:1.15 to 1:4.5, as and in thermal and/or acoustic insulating material. Suitable modified melamine resin fibers are described in EP-A 523 485, for example. The fibers can be processed into shaped thermal and/or acoustic insulation articles by customary methods known to one skilled in the art. Such methods will be described in more detail in what follows. Advantageously, the modified melamine-formaldehyde resin fibers described in EP-A 523 485 have a more textile hand than conventional melamine resin fibers. They are less brittle and do not break so easily, so that generally fewer short fibrous filaments and dust are released on processing into shaped articles, for example fiber mats. In addition, they are generally also kinder to the skin than the conventional fibers. Insulating materials based on the melamine resin fibers described in EP-A-523 485 are preferably useful for thermal and/or acoustic protection of buildings and parts of buildings. They are further useful for thermal and/or acoustic insulation in mechanical engineering, refrigeration technology, for insulating liquid- and/or gas-conducting pipes on the inside and outside of buildings, etc.

In a suitable embodiment, the aforementioned melamine resin fibers can be used together with polyalkylene terephthalate fibers. Polyalkylene terephthalate fibers which are suitable for this purpose are described in what follows.

The present invention further provides an insulating material comprising
a) from 5 to 95% by weight of melamine resin fibers,
b) from 5 to 95% by weight of polyalkylene terephthalate fibers, and optionally c) up to 30% by weight of further fibers, and/or d) up to 20% by weight of additives.

Component a)

Suitable melamine resin fibers are unmodified melamine resin fibers and preferably modified melamine resin fibers and mixtures thereof.

Melamine/formaldehyde condensation products which are suitable for producing melamine resin fiber mats are described in EP-A 0 080 655, fully incorporated herein by reference. The melamine/formaldehyde condensation products may, as well as melamine, contain up to 50% by weight, preferably up to 20% by weight, of other thermoset-formers and, as well as formaldehyde, up to 50% by weight, preferably up to 20% by weight, of other aldehydes in cocondensed form.

Suitable other thermoset-formers include, for example, alkyl-substituted melamine, urea, urethanes, carboxamides, dicyandiamide, guanidine, sulfurylamide, sulfonamide, aliphatic amines and also phenol and its derivatives.

Suitable other aldehydes include, for example, acetaldehyde, trimethylolacetaldehyde, acrolein, benzaldehyde, furfural, glyoxal, phthalaldehyde and terephthalaldehyde.

The molar ratio of thermoset-formers to aldehyde is generally within the range from about 1:1.5 to about 1:4.5. If unmodified melamine/formaldehyde condensates are used, then the molar ratio is generally within the range from about 1:2.5 to about 1:3.5.

Such fibers can be produced, for example, by spinning a highly concentrated aqueous solution of a melamine-aldehyde precondensate. Such processes are described in DE-A 23 64 091, for example, and may utilize a hauler plate or a die. The fibers are predried, optionally stretched, and finally the melamine resin is cured at from about 150 to 250° C. Possible curing catalysts are customary acids, for example sulfuric acid, hydrochloric acid, acetic acid or preferably formic acid, which are added to the aqueous solution of the precondensate in amounts of from about 0.1 to 5.0% by weight. It is likewise possible to add the curing catalyst after spinning, together with air during the curing step.

If desired, the fibers can be provided with binders to bond the individual fibers at the nodal sites of the fiber mat. Suitable binders include, for example, melamine, phenol or urea resins, which are generally used in amounts from about 1 to 8% by weight, based on the fiber weight. The binder, for example in the form of an aqueous dispersion, can be sprayed onto the fibers directly after their formation.

The fibers thus obtained are generally from about 3.0 to 30 μm in thickness and from about 10 to 150 mm in length. Their tensile strength is generally within the range from about 100 to 1000 N mm$^{-2}$ and their breaking extension is within the range from about 3 to 30%.

In a preferred embodiment, component a) comprises modified melamine resin fibers as described in EP-A 523 485, fully incorporated herein by reference.

These melamine resin fibers contain as monomer building block (A) from 90 to 99.9 mol % of mixture comprising essentially from 30 to 99, preferably from 50 to 95, particularly preferably from 85 to 95, mol % of melamine and from 1 to 70, preferably from 1 to 50, particularly preferably from 5 to 15, mol % of a substituted melamine of the formula I or mixtures of substituted melamines of the formula I.

As further monomer building blocks (B) the preferred melamine resin fibers contain a) from 0.1 to 10 mol %, preferably from 0.1 to 9.5 mol %, based on the total number of moles of monomer building blocks (A) and (B), of a phenol or of a mixture of phenols.

The preferred melamine resin fibers a) are customarily obtainable by reacting the components (A) and (B) with formaldehyde or formaldehyde-supplying compounds and subsequent spinning, the molar ratio of melamines to formaldehyde being within the range from about 1:1.15 to 1:4.5, preferably within the range from about 1:1.8 to 1:3.0.

Suitable substituted melamines of the general formula I

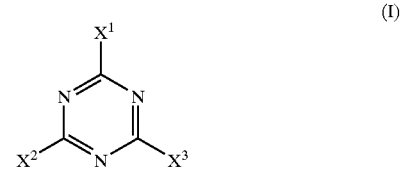

(I)

are those in which $X^1$, $X^2$ and $X^3$ are each selected from —$NH_2$, —$NHR^1$ and —$NR^1R^2$, subject to the proviso that $X^1$, $X^2$ and $X^3$ are not all —$NH_2$, and $R^1$ and $R^2$ are independently selected from hydroxy-$C_2$–$C_{10}$-alkyl, hydroxy-$C_2$–$C_4$-alkyl(oxa-$C_2$–$C_4$-alkyl)$_n$, where n is from 1 to 5, and amino-$C_2$–$C_{12}$-alkyl.

Preferred hydroxy-$C_2$–$C_{10}$-alkyl includes hydroxy-$C_2$–$C_6$-alkyl such as 2-hydroxyethyl, 3-hydroxy-n-propyl, 2-hydroxyisopropyl, 4-hydroxy-n-butyl, 5-hydroxy-n-pentyl, 6-hydroxy-n-hexyl, 3-hydroxy-2,2-dimethylpropyl, preferably hydroxy-$C_2$–$C_4$-alkyl such as 2-hydroxyethyl, 3-hydroxy-n-propyl, 2-hydroxyisopropyl and 4-hydroxy-n-butyl, particularly preferably 2-hydroxyethyl and 2-hydroxyisopropyl.

Preferred hydroxy-$C_2$–$C_4$-alkyl(oxa-$C_2$–$C_4$-alkyl)$_n$ groups are those with n from 1 to 4, particularly preferably those with n=1 or 2 such as 5-hydroxy-3-oxapentyl, 5-hydroxy-3-oxa-2,5-dimethyl-pentyl, 5-hydroxy-3-oxa-1, 4-dimethylpentyl, 5-hydroxy-3-oxa-1,2,4,5-tetramethylpentyl, 8-hydroxy-3,6-dioxaoctyl.

Amino-$C_2$–$C_{12}$-alkyl is preferably amino-$C_2$–$C_8$-alkyl such as 2-aminoethyl, 3-aminopropyl, 4-aminobutyl, 5-aminopentyl, 6-aminohexyl, 7-aminoheptyl and 8-aminooctyl, particularly preferably 2-aminoethyl and 6-aminohexyl, very particularly preferably 6-aminohexyl.

The following compounds are substituted melamines which are particularly useful for this invention:

2-hydroxyethylamino-substituted melamines such as 2-(2-hydroxyethylamino)-4,6-diamino-1,3,5-triazine, 2,4-di(2-hydroxyethylamino)-6-amino-1,3,5-triazine, 2,4,6-tris(2-hydroxyethylamino)-1,3,5-triazine, 2-hydroxyisopropylamino-substituted melamines such as 2-(2-hydroxyisopropylamino)-4,6-diamino-1,3,5-triazine, 2,4-di(2-hydroxyisopropylamino) -6-amino-1, 3,5-triazine, 2,4,6-tris(2-hydroxyisopropylamino)-1,3, 5-triazine, 5-hydroxy-3-oxapentylamino-substituted melamines such as 2-(5-hydroxy-3-oxapentylamino)-4,6-diamino-1,3,5-triazine, 2,4,6-tris(5-hydroxy-3oxapentylamino)-1,3,5-triazine, 2,4-di(5-hydroxy-3-oxapentylamino)-6-amino-1,3,5-triazine, 6-aminohexylamino-substituted melamines such as 2-(6-aminohexylamino)-4,6-diamino-1,3,5-triazine, 2,4-di (6-aminohexylamino)-6-amino-1,3,5-triazine, 2,4,6-tris(6-aminohexylamino)-1,3,5-triazine or mixtures of these compounds, for example a mixture of 10 mol % of 2-(5-hydroxy-3-oxapentylamino)-4,6-diamino-1,3,5-triazine, 50 mol % of 2,4-di(5-hydroxy- 3-oxapentyl amino)-6-amino-1,3,5-triazine and 40 mol % of 2,4,6-tris(5-hydroxy-3-oxapentyl-amino)-1,3,5-triazine.

Suitable phenols (B) include phenols containing one or two hydroxyl groups, such as unsubstituted phenols, phenols substituted by radicals selected from the group consisting of $C_1$–$C_9$-alkyl and hydroxyl, and also $C_1$–$C_4$-alkanes substituted by two or three phenol groups, di(hydroxyphenyl) sulfones, and mixtures thereof.

Preferred phenols include phenol, 4-methylphenol, 4-tert-butyl-phenol, 4-n-octylphenol, 4-n-nonylphenol, pyrocatechol, resorcinol, hydroquinone, 2,2-bis(4-hydroxyphenyl)propane, bis(4-hydroxyphenyl) sulfone, particularly preferably phenol, resorcinol and 2,2-bis(4-hydroxyphenyl)propane.

Formaldehyde is generally used as an aqueous solution having a concentration of, for example, from 40 to 50% by weight or in the form of compounds that supply formaldehyde in the course of the reaction with (A) and (B), for example as oligomeric or polymeric formaldehyde in solid form, such as paraformaldehyde, 1,3,5-trioxane or 1,3,5,7-tetroxane.

The preferred melamine resin fibers a) are produced by polycondensing customarily melamine, optionally substituted melamine and optionally phenol together with formaladehyde or formaldehyde-supplying compounds. Either all the components can be present from the start, or they can be added portionwise and gradually to the reaction, further melamine, substituted melamine or phenol being subsequently added to the precondensates formed.

The polycondensation is typically carried out in a conventional manner (see EP-A 355 760, and Houben-Weyl, vol. 14/2, p. 357 et seq.).

The reaction temperatures used are generally chosen within the range from 20 to 150° C., preferably from 40 to 140° C.

The reaction pressure is typically uncritical. In general, the pressure employed is within the range from 100 to 500 kPa, preferably from 100 to 300 kPa.

The reaction can be carried out with or without solvent. Typically, no solvent is added when aqueous formaldehyde solution is used. If formaldehyde bound in solid form is used, water is usually used as solvent, and the amount used is typically within the range from 5 to 40, preferably from 15 to 25, % by weight based on the total amount of monomer used.

Furthermore, the polycondensation is generally carried out within a pH range above 7. Preference is given to the pH range from 7.5 to 10.0, particularly preferably from 8 to 9.

Moreover, the reaction mixture may include small amounts of customary additives such as alkali metal sulfites, for example sodium disulfite and sodium sulfite, alkali metal formates, for example sodium formate, alkali metal citrates, for example sodium citrate, phosphates, polyphosphates, urea, dicyandiamide or cyanamide. They can be added as pure individual compounds or as mixtures with one another, in each case without a solvent or as aqueous solutions, before, during or after the condensation reaction.

Other modifiers are amines and also amino alcohols such as diethylamine, ethanolamine, diethanolamine or 2-diethylamino-ethanol.

Further additives suitable for the production of melamine resin fibers a) are fillers or emulsifiers. As fillers it is possible to use for example fibrous or pulverulent inorganic reinforcing agents or fillers such as glass fibers, metal powders, metal salts or silicates, for example kaolin, talc, baryte, quartz or chalk, also pigments and dyes. Emulsifiers used are generally the customary nonionic, anionic or cationic organic compounds having long-chain alkyl radicals.

The polycondensation is generally carried out batchwise or continuously, for example in an extruder (see EP-A 355 760), in a conventional manner.

Fibers are generally produced by spinning the melamine resin of the invention in a conventional manner, for example following addition of a curing agent, customarily acids, such as formic acid, sulfuric acid and ammonium chloride, at room temperature, in a rotospinning apparatus and subsequently curing the crude fibers in a heated atmosphere, or by spinning in a heated atmosphere, simultaneously evaporating the water used as solvent and curing the condensate. Such a process is described in detail in DE-A 23 64 091.

Component b)

Suitable polyalkylene terepthalate fibers are preferably selected from polyethylene terephthalate fibers, polybutylene terephthalate fibers and mixtures thereof. Preference is given to using polyethylene terephthalate fibers. The proportion of component b) in the insulating materials of the present invention is generally within the range from about 5 to 95% by weight, preferably within the range from about 20 to 90% by weight.

In a preferred embodiment, the polyethylene terephthalate fibers used are bicomponent fibers having a core-sheath construction. Such fibers (melt-fusible fibers) and processes for their production are described in Franz Fourné, Synthetische Fasern, Wissenschaftliche Verlagsgesellschaft, Stuttgart 1964 and in Herrmann Ludewig, Polyesterfasern, Akademie Verlag, Berlin 1975, both fully incorporated herein by reference. These bicomponent fibers comprise a high melting polyester core which generally comprises a polyethylene terephthalate homopolymer. The melting temperature of the core is generally within the range from about 200 to 300° C., preferably within the range from about 230 to 280° C. This high melting core is surrounded by a sheath having a lower melting temperature. This sheath comprises for example copolyesters which, as well as terephthalic acid, contain further aromatic and/or aliphatic dicarboxylic acids and/or, as well as ethylene glycol, further diols in copolymerized form, so that the properties can be varied within wide limits. Suitable further aromatic dicarboxylic acids are for example isophthalic acid. Suitable further aliphatic dicarboxylic acids are for example $C_3$–$C_{12}$-dicarboxylic acids, e.g., malonic acid, succinic acid, adipic acid, sebacic acid, etc. Suitable further diols are for example propylene glycol, 1,4-butanediol, 1,5-pentanediol, neopentylglycol, 1,6-hexanediol, 2-methyl-1,5-pentanediol, 2-ethyl-1,4-butanediol, polyalkylene glycols, e.g., polyethylene glycol and polypropylene glycol, and also the alkoxylates of dihydric or higher hydric alcohols. This includes for example ethoxylated, propoxylated and mixed ethoxylated and propoxylated dihydric, trihydric, tetrahydric, pentahydric and hexahydric alcohols and polyesterols. The degree of alkoxylation is generally within the range from 1 to 300, preferably within the range from 2 to 150.

The melting temperature of the sheath is generally within the range from about 80 to 150° C., preferably within the range from 100 to 130° C.

The preferred polyethylene terephthalate fibers b) with a core/sheath construction have an individual fiber linear density which is generally within the range from about 1 to 20 dtex, preferably within the range from about 2 to 15 dtex. 1 dtex is a linear density of 1 g/10,000 m and corresponds to a round fiber diameter of somewhat more than 10 μm. The linear density is proportional to the square of the diameter.

The density of these preferred components b) is generally within the range from about 1.1 to 1.6 g/cm$^3$. Polyalkylene terephthalate fibers generally have very good aging resistance, good light and weather stability, very good rotting resistance and also good acid resistance. They are stable to most organic solvents and have a high relative wet strength, which is preferably about 100%. The moisture regain at 95% relative humidity and 20° C. is generally very small, of the order of not more than 1.0%; preferably not more than about 0.5%.

The polyalkylene terephthalate fibers used according to the present invention are generally used without flameproofing treatment. The core-sheath polyethylene terephthalate fibers preferred for use as component b) have a DIN 51 794 autoignition temperature of not less than 450° C., preferably not less than 500° C. The decomposition temperature is generally not less than 270° C., preferably not less than 300° C.

Fibrous products composed of polyalkylene terephthalate fibers have the advantage of being ecologically safe. The polyesters used are inert and rot-resistant to natural soil substances.

If desired, the polyalkylene terephthalate fibers may comprise customary fillers, for example glass fibers, metal powders, silicates, talc, baryte, quartz or chalk, titanium dioxide and also pigments and dyes. In general, the weight proportion of these additives in component b) is not more than 20% by weight, preferably not more than 10% by weight, based on the total amount of component b).

To produce fibers, the polyalkylene terephthalates can be spun by known processes. Suitable spinning processes, for example melt spinning, are described for example in A. Echte, Handbuch der technischen Polymerchemie, VCH Weinheim, 1993, pages 563 following, and in A. Franck, Kunststoff-Kompendium, Vogel-Buchverlag, 4th edition, 1996, pages 166 following. To produce the core-sheath bicomponent fibers preferred for use as component b), the polyethylene terephthalates and corresponding copolyesters can be obtained by cospinning the two different components similarly to coextrusion. These systems are then preferably present as uncrimped fiber.

Component c)

In addition to components a) and b), the insulating materials of the present invention may further comprise up to 20% by weight of further fibers. Suitable further fibers include for example natural fibers, such as wool and cotton, or synthetic fibers, such as polyamide fibers, polyimide fibers and aramid fibers, polyacrylonitrile fibers, cellulose fibers, such as viscose etc. Preferably, the insulating materials of the present invention are produced without the use of additional fibers.

Component d)

The insulating materials of the present invention may comprise up to 20% by weight of further additives. These include, for example, the binders mentioned above in connection with component a), which bond the individual fibers and the nodal points of the fiber mats. Suitable binders are melmaine, phenol or urea resins, which are generally used in an amount from about 1 to 8% by weight, preferably from 2 to 5% by weight, based on total fibers. It is further possible to use binders based on arylates, for example. These binders customarily also comprise flame retardants. These binders can if desired be added to one or more of the fiber components a), b) and/or c) or to a mixture thereof. To this end, for example, the binder can be sprayed onto the fibers as an aqueous dispersion. It may comprise customary fillers, preferably those which increase the flame resistance, such as borates, phosphates, cf. supra. If bicomponent fibers are used as component b), no addition of binder is preferably necessary, in general.

The insulating materials used according to the present invention are produced from component a) immediately in the course of the production of the melamine resin fiber by laying the fiber down on a belt in the desired thickness following addition of the binder. The insulating materials of the present invention are produced from the aforementioned components a) to d) by i) the components a), b) and optionally c) and/or d), optionally after a pretreatment, being mixed, optionally carded and laid down to form a mat, ii) the mat being heated, and iii) the tempered mat being optionally cut to size and/or coated.

Step i)

In general, the fiber components a), b) and any further synthetic fibers c) used are cured, stretched and optionally subjected to further customary after treatment processes in a conventional manner after spinning. Thereafter they can be further processed into staple fibers, again in a conventional manner. This further processing may comprise, on the one hand, a finishing step, for example to confer antistatic properties, conductivity and/or adhesiveness on the fiber. Moreover, the flat fibers can if desired be crimped (textured), for example by stuffer box crimping or wet crimping. If core-sheath polyethylene terephthalate fibers are used as component b), they are preferably not crimped. The fibers are finally cut into staple fibers of the desired length in a cutting machine. Processes for producing staple fibers and suitable apparatus and machines are described in Bela von Falkai, Synthesefasern, Verlag Chemie, Weinheim 1981, and also in A. Echte, Handbuch der technischen Polymerchemie, VCH-Verlagsgesellschaft Weinheim, 1993, pages 563 following. The individual components a), b) and also optionally c) and/or d) are subsequently blended in customary fiber blending apparatus as described, for example, in Vliesstoffe, Georg-Thieme-Verlag. This fiber blend is then conventionally carded and laid down to form a mat or fed as loose fiber by means of a fiber feeder and laid down to form a mat. Apparatus and processes for carding fibers are described for example in Ullmann's Enzyklopädie der technischen Chemie, 3rd edition, Volume 17, 1966, page 227.

Step ii)

The mat which has been laid down is tempered at elevated temperatures, for example within the range from about 100 to 300° C., to fully cure the melamine resin if necessary, to evaporate any water still present from the production process and to bond the individual fibers where appropriate. To achieve the latter, binders can be added to the fibers as described above. If polyethylene terephthalate fibers in the form of a bicomponent fiber are used as component b), the mat is tempered at a temperature higher than the melting temperature of the sheath and lower than the melting temperature of the core to bond the fibers together to form a stable, elastic mat.

Step iii)

The mat-form insulating materials of the present invention can finally be conventionally cut to size and optionally coated (laminated). Suitable coating materials include metal foils, for example of aluminum, organic dispersions comprising fillers and also inorganic dispersions or emulsions.

The thickness of the mat-form insulating materials of the invention is generally within the range from 20 to 200 mm, preferably within the range from 50 to 100 mm. The density is within the range from 10 to 150 $gl^{-1}$, preferably within the range from 15 to 50 $gl^{-1}$.

The insulating materials of the present invention are advantageously notable for good application properties. For instance, the DIN 52 612 thermal conductivity is not more than 0.045 W m$^{-1}$ K$^{-1}$, preferably not more than 0.04 W m$^{-1}$ K$^{-1}$.

The DIN 52 215-83 sound adsorption, converted from perpendicular to stationary sound incidence, is not less than 92%, preferably not less than 95%.

The recovery capacity is determined on a mat 100 mm in thickness. If the insulating materials of the present invention are present in a thicker mat, this is cut to size appropriately, whereas thinner mats are-superposed plurally.

When a 100 mm thick mat is compressed to 30 mm within 2 minutes and held at that thickness for 24 hours, the recovery capacity of the insulating materials of the present invention is so high that the mat, on the pressure being removed, spontaneously recovers not less than 80%, preferably not less than 90%. The insulating materials of the present invention generally recover after 6 hours to not less than 98%, preferably to not less than 99%. More particularly, a recovery of not less than 98%, preferably not less than 99%, is achieved after a shorter time, for example after about 30 minutes. Good recovery is important for the transportation, the storage and the installation of the mats. After their production and end-iteming, the mat webs are generally rolled up and, in the process, highly compressed in order that their volume may be reduced for transporation and storage. To install them, they are unrolled again, when they should return to their original thickness and hence also to the original density as rapidly as possible. In addition, insufficient recovery and the attendant increased density reduce the insulating effect.

The insulating materials of the present invention achieve building material class B1 (low-flammable) in the DIN 4102 Part 1 fire test.

The insulating materials of the present invention, for example in the form of fiber mats, can be used for the thermal and acoustic protection of buildings and parts of buildings. They are especially useful for insulating roofs.

Examples which follow illustrate the invention.

EXAMPLES

The viscosity values reported in the examples are determined using a cone/plate viscometer (from Epprecht Instruments+Controls, measuring cone "Type D") at a shear rate of 20 s$^{-1}$ and 20° C.

The recovery capacity was determined on a 100 mm thick mat, which was compressed to 30 mm within 2 minutes and held at that thickness for 24 hours.

The thermal conductivity was determined in accordance with DIN 52 612.

The sound absorption was determined at 2000 Hz in accordance with DIN 52 215.

Example 1

Melamine resin with 3 mol % of phenol in accordance with EP-A-0 523 485.

1791.7 g (14.22 mol) of melamine and 626.1 g of 80% strength by weight aqueous solution of 2,4,6-tris-(5-hydroxy-3-oxa pentylamino)-1,3,5-triazine (1.52 mol) and 44.6 g (0.47 mol) of phenol are mixed together with 557.9 g of paraformaldehyde, 7.0 g of 2-diethylaminoethanol and 1093.8 g of 40% strength by weight aqueous formaldehyde solution. The reaction mixture is refluxed until it has a viscosity of 500 Pa·s.

Example 2

80 parts of modified melamine resin fibers based on a melamine resin of Example 1 and 20 parts of polyethylene terephthalate staple fibers having a core-sheath construction (core melting point: about 250° C.; sheath melting point: about 115° C.; linear density: 4 dtex; length: 50 mm) are blended by means of a conventional fiber blender, carded and laid down by means of a cross-layer to form a mat 100 mm in thickness. This mat is then tempered at 160° C. in a heating duct. This causes the sheath of the polyethylene terephthalate staple fiber to melt and so bond the fibers together to form a staple, elastic mat.

Application Properties

Recovery capacity: spontaneous: 95% after 30 minutes: 100%

DIN 52 612 thermal conductivity: 0.035 W m$^{-1}$ K$^{-1}$

DIN 52 215 sound absorption degree at 2000 Hz: 98

We claim:

1. A method of thermally or acoustically insulating a building, said method comprising installing a mat-form insulating material in the building, wherein the insulating material comprises form 5 to 95% by weight of at least one modified melamine resin fiber and from 5 to 95% by weight of a polyalkylene terephthalate fiber, wherein said melamine fiber is obtained by condesing a melamine containing mixture with formaldehyde or a formaldehyde-supplying compound in a molar ratio of melamine to formaldehyde within the range from 1:1.15 to 1:4.5, said melamine mixture comprising (A) from 90 to 99.9 mol % of mixture comprising
    (a) from 30 to 99.9 mol % of melamine and
    (b) from 1.0 to 70 mol % of a substituted melamine of the general formula I

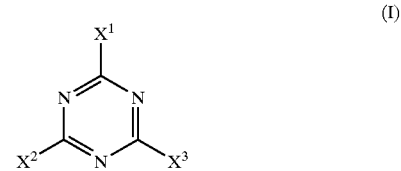

where $X^1$, $X^2$ and $X^3$ are each selected from —$NH_2$, —$NHR^1$ and —$NR^1R^2$, subject to the proviso that $X^1$, $X^2$ and $X^3$ are not all —$NH_2$, and $R^1$ and $R^2$ are independently selected from hydroxy-$C_2$–$C_{20}$-alkyl, hydroxy-$C_2$–$C_4$-alkyl-(oxa-$C_2$–$C_4$-alkyl)$_n$, where n is 1 to 5, and amino-$C_2$–$C_{12}$-alkyl, or mixtures of melamines of formula I, and (B) from 0.1 to 10 mol %, based on (A) and (B), of a compound selected from phenols which are unsubstituted or substituted by radicals selected from $C_1$–$C_9$-alkyl and hydroxyl, $C_1$–$C_4$-alkanes substituted by two or three phenol groups, di(hydroxyphenyl) sulfones and mixtures thereof, wherein the insulating material has a density of from 10 to 150 gl$^{-1}$, wherein the thickness of the mat-form insulating material is from 20 to 200 mm, wherein the polyalkylene terephthalate fiber is selected from a polyethylene terephthalate fiber, a polybutylene terephthalate fiber or a mixture thereof, wherein the polyalkylene terephthalate fiber is a bicomponent fiber having a core/sheath construction comprising a polyester core and a copolyester sheath, and wherein the melting temperature of the core of the bicomponent fiber is within the range from 200 to 300° C., and the melting temperature of the sheath is within the range of from 80 to 150° C.

2. The method of claim 1, wherein the mat-form insulating material has a DIN 52 612 thermal conductivity of not more than 0.045 W m$^{-1}$ K$^{-1}$.

3. The method of claim 1, wherein the mat-form insulating material has a DIN 52 215-83 sound adsorption, converted from perpendicular to stationary sound incidence, of not less than 92%.

4. The method of claim 1, wherein the mat-form insulating material further comprises
   c) an amount, up to 30% by weight of polyacrylonitrile fibers and optionally
   d) up to 20% by weight of additives.

5. The method of claim 1, wherein the polyalkylene terephthalate fiber is selected from polyethylene terephthalate fibers, polybutylene terephthalate fibers or mixtures thereof.

6. The method of claim 1, wherein the individual fiber linear density of the bicomponent fibers is within the range of from 1 to 20 dtex.

7. The method of claim 1, further comprising producing the mat-form insulating material by mixing the melamine resin fiber and the polyalkylene terephthalate fiber to form a mixture, laying down the mixture to form a mat, and heating the mat.

8. The method of claim 7, wherein the temperature of the heating is higher than the melting temperature of the sheath and lower than the melting temperature of the core.

9. The method of claim 1, wherein the melting temperature of the core of the bicomponent fibers is within the range of from 230 to 280° C.

10. The method of claim 1, wherein the melting temperature of the sheath of the bicomponent fibers is within the range of from 100 to 130° C.

11. The method of claim 1, wherein the individual fiber linear density of the bicomponent fibers is within the range of from 2 to 15 dtex.

12. The method of claim 1, wherein the insulating material has a density of from 15 to 50 gl$^{-1}$.

13. A mat-form insulating material comprising:
i) from 5 to 95% by weight of melamine resin fibers, which are obtained by condensing a melamine-containing mixture with formaldehyde or formaldehyde-supplying compounds in a molar ratio of melamines to formaldehyde within the range of 1:1.15 to 1:4.5, said melamine-containing mixture comprising
   (A) from 90 to 99.9 mol % of a mixture comprising
      (a) from 30 to 99.9 mol % of melamine and
      (b) from 1.0 to 70 mol % of a substituted melamine of the formula I
      where $X^1$, $X^2$ and $X^3$ are each selected from —NH$_2$, —NHR$^1$ and —NR$^1$R$^2$, subject to the proviso that $X^1$, $X^2$ and $X^3$ are not all —NH$_2$, and $R^1$ and $R^2$ are independently selected from hydroxy-C$_2$–C$_{20}$-alkyl, hydroxy-C$_2$–C$_4$-alkyl-(oxa-C$_2$–C$_4$-alkyl)$_n$, where n is 1 to 5, and amino-C$_2$–C$_{12}$-alkyl, or mixtures of melamines of formula I, and
   (B) from 0.1 to 10 mol %, based on (A) and (B), of a compound selected from phenols which are unsubstituted or substituted by radicals selected from C$_1$–C$_9$-alkyl and hydroxyl, C$_1$–C$_4$-alkanes substituted by two or three phenol groups, di(hydroxyphenyl) sulfones and mixtures thereof,
ii) from 5–95% by weight of polyalkylene terepthalate fibers,
iii) up to 30% by weight, of polyacrylonitrile fibers, and optionally
iii) up to 20% by weight of additives.
wherein the polyalkylene terephthalate fibers are selected from polyethylene terephthalate fibers, polybutylene tereptalate fibers or a mixture thereof,
wherein the polyalkylene terephthalate fibers are bicomponent fibers having a core/sheath construction comprising a polyester core and a copolyester sheath, and
wherein the melting temperature of the core of the bicomponent fibers is within the range from 200 to 300° C., and the melting temperature of the sheath is within the range of from 80 to 150° C.

\* \* \* \* \*